(12) United States Patent
Egara

(10) Patent No.: US 6,386,280 B1
(45) Date of Patent: May 14, 2002

(54) THERMOSTATIC COOLANT CIRCULATING DEVICE

(75) Inventor: Yoshitaka Egara, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/574,068

(22) Filed: May 18, 2000

(30) Foreign Application Priority Data

Jul. 8, 1999 (JP) ............................................. 11-194937

(51) Int. Cl.[7] ................................................. F25B 29/00
(52) U.S. Cl. ........................... 165/263; 165/205; 62/99; 62/185
(58) Field of Search ................................... 165/205, 206, 165/263, 264, 299, 300; 62/98, 99, 117, 185, 201, 196.4

(56) References Cited

U.S. PATENT DOCUMENTS

| | | | | |
|---|---|---|---|---|
| 2,164,730 A | * | 7/1939 | Backstrom ............... | 165/264 X |
| 2,788,264 A | * | 4/1957 | Bremer et al. .......... | 165/263 X |
| 2,885,866 A | * | 5/1959 | Kleist et al. ............ | 165/263 X |
| 4,769,998 A | * | 9/1988 | Oswalt et al. .................. | 62/98 |
| 5,228,301 A | * | 7/1993 | Sjoholm et al. ........ | 165/263 X |
| 5,862,675 A | | 1/1999 | Scaringe et al. ........... | 62/193.3 |
| 5,941,083 A | * | 8/1999 | Sada et al. .............. | 165/263 X |
| 6,003,595 A | * | 12/1999 | Watanabe ............... | 165/264 X |

* cited by examiner

Primary Examiner—Ljiljana Ciric
(74) Attorney, Agent, or Firm—Oblon, Spivak, McClelland, Maier & Neustadt, P.C.

(57) ABSTRACT

A coolant circuit 21 for circulating a coolant to a load 20 includes a temperature sensor 35 that measures the temperature of the coolant sent out from a heat exchanger 25. A refrigerating circuit 22 in which the aforesaid coolant has its temperature raised by cooling the load 20 in the heat exchanger 25 by allowing heat exchange with a refrigerant includes an electronic expansion valve 52 capable of adjusting the flow rate of the refrigerant supplied to the aforesaid heat exchanger 25. A control section 23 has a circuit section for adjusting the opening degree of the aforesaid electronic expansion valve 52 so that the temperature of the coolant measured by the aforesaid temperature sensor 35 will be a set temperature.

4 Claims, 2 Drawing Sheets

THERMOSTATIC COOLANT CIRCULATING DEVICE

FIELD OF THE INVENTION

The present invention relates to a thermostatic coolant circulating device that circularly supplies a thermostatic coolant to a load.

PRIOR ART

FIG. 2 shows one example of a known thermostatic coolant circulating device. This thermostatic coolant circulating device has a coolant circuit 2 for circularly supplying a thermostatic coolant to a load 1, a refrigerating circuit 3 for cooling the aforesaid coolant having its temperature raised by cooling the load 1, and a control section 4 that controls these circuits 2, 3.

In the aforesaid coolant circuit 2, the coolant having its temperature raised by cooling the load 1 refluxes through a return pipe 6 into a heat exchanger 7. After the coolant is cooled below a set temperature in this heat exchanger 7 by heat exchange with a refrigerant flowing through an evaporator 8 of the aforesaid refrigerating circuit 3, the coolant flows into a heating vessel 9 to be heated up to a set temperature by a heater 10, and then overflows this heating vessel 9 to flow into a tank 11. Then, the coolant is supplied through a supplying pipe 13 to the aforesaid load 1 by a pump 12. The temperature of the aforesaid coolant is measured by a temperature sensor 14 disposed at an outlet of the tank 11, and the aforesaid heater 10 is controlled by the control section 4 so that the temperature measured here will be the set temperature.

On the other hand, in the aforesaid refrigerating circuit 3, the refrigerant evaporated by heat exchange with the coolant in the aforesaid evaporator 8 is compressed by a compressor 15 into a high-temperature high-pressure refrigerant gas. This refrigerant gas is cooled by a condenser 16 to be condensed into a high-pressure liquid refrigerant. Then, the temperature of this liquid refrigerant is lowered by reducing the pressure thereof by means of a constant-pressure expansion valve 17 for supplying it to the aforesaid evaporator 8. The flow rate of the refrigerant circulating through the circuit is always maintained constant by the aforesaid constant-pressure expansion valve 17. Therefore, the cooling capability of this refrigerating circuit 3 is always constant irrespective of whether the thermal load is larger or small.

Thus, in the conventional coolant circulating device, the coolant having a raised temperature is cooled below the set temperature by the refrigerating circuit and then heated up to the set temperature by the heater, necessitating the use of the heater at all times and leading to large electric-power consumption. Particularly, in the case where the temperature of the coolant does not rise so much due to a small heat quantity of the load, the aforesaid coolant is cooled more than necessary to an excessively low temperature. In order to heat it up to the set temperature by the heater, an extremely large heat quantity has been required. Moreover, in the case where the temperature of the aforesaid coolant is higher than an external atmospheric temperature, a temperature decrease caused by heat dissipation to the outside is added to further lower the temperature of the coolant, thereby requiring a further large heat quantity to heat it to the set temperature. As a result of this, the capability of the heater will necessarily be larger; related equipment will be larger; and the maximum operation current and the electric power consumption will be larger, leading to increase in the running cost, the equipment cost, and others.

SUMMARY OF THE INVENTION

A principal technical object of the present invention is to provide a thermostatic coolant circulating device having a good operation efficiency and being economical in which a coolant having a temperature raised by cooling a load can be maintained at a set temperature in a refrigerating circuit by allowing the cooling capability of the aforesaid refrigerating circuit to be adjustable in accordance with a temperature rise of the coolant.

Another technical object of the present invention is to use a heater auxiliarily in the aforesaid coolant circulating device for raising the temperature of the aforesaid coolant in the case where the temperature rise of the coolant by the load is small or in the case where the temperature of the coolant falls below the set temperature due to heat dissipation to the outside, thereby to achieve scale reduction of the aforesaid heater and reduction in the equipment cost for heating and the running cost.

In order to solve the aforesaid objects, the present invention provides a thermostatic coolant circulating device comprising a coolant circuit for circularly supplying a coolant to a load, a refrigerating circuit in which the aforesaid coolant having a temperature raised by cooling the load is cooled in a heat exchanger by allowing heat exchange with a refrigerant, and a control section that controls these circuits.

The aforesaid refrigerating circuit has a valve means capable of adjusting a flow rate of the refrigerant supplied to the aforesaid heat exchanger; the aforesaid coolant circuit has a temperature sensor for measuring the temperature of the coolant cooled in the aforesaid heat exchanger; and the aforesaid control section has a circuit means for adjusting an opening degree of the aforesaid valve means so that the temperature of the coolant measured by the aforesaid temperature sensor will be a set temperature.

In the coolant circulating device of the present invention having the aforesaid construction, the coolant having a temperature raised by cooling a load having a large heat quantity is cooled to a set temperature by the heat exchanger and is supplied to the load again. At this time, if the temperature of the coolant measured by the aforesaid temperature sensor is higher than the set temperature, the opening degree of the aforesaid valve means increases to increase the flow rate of the refrigerant flowing into the heat exchanger, whereby the cooling capability increases to lower the temperature of the coolant to the set temperature. On the other hand, if the measured temperature of the coolant is lower than the set temperature, the opening degree of the aforesaid valve means decreases to decrease the flow rate of the aforesaid refrigerant, whereby the cooling capability decreases to dissolve excessive cooling of the coolant and the temperature thereof is maintained at the set temperature.

Thus, the temperature of the aforesaid coolant is maintained at the set temperature by adjusting the cooling capability of the refrigerating circuit in accordance with the temperature of the coolant.

According to one specific embodiment of the present invention, the aforesaid coolant circuit has a tank for housing the coolant sent out from the aforesaid heat exchanger, a heater for heating and raising the temperature of the aforesaid coolant, and a pump for supplying the coolant in the aforesaid tank to the load; the aforesaid temperature sensor is disposed at an outlet of the aforesaid heat exchanger so as to be capable of measuring the temperature of the coolant before being heated by the heater; and the aforesaid control section has a function of energizing the aforesaid heater when the temperature of the coolant measured by the aforesaid temperature sensor falls below the set temperature by more than a predetermined value.

This makes it possible to maintain the aforesaid coolant at the set temperature by using the heater auxiliarily even if the temperature of the coolant rises only a little due to small heat quantity of the load or if the liquid temperature falls below the set temperature by heat dissipation to the outside atmosphere.

In other words, in the case where the temperature rise of the coolant by the load is small as described above or in the case where a temperature decrease occurs in an external pipe before and after the load by heat dissipation due to the temperature of the coolant being higher than the external atmospheric temperature, the temperature of the coolant is cooled below the set temperature by the heat exchanger even if the cooling capability of the aforesaid refrigerating circuit is restricted to the minimum. For this reason, the control section energizes the heater on the basis of a measurement signal from the aforesaid temperature sensor to heat the coolant to the set temperature.

Thus, the use of the heater is limited only to the case where the temperature rise of the coolant by the load is small or the case where the temperature of the coolant falls below the set temperature by heat dissipation to the outside, and it is an auxiliary use that compensates for the decrease. This allows use of a smaller heater as compared with a conventional device that makes use of the heater at all times, whereby the equipment cost is reduced and also the maximum electric current of use and the consumed electric power are reduced to lower the running cost.

According to a specific preferable embodiment of the present invention, the aforesaid refrigerating circuit has an evaporator disposed in the aforesaid heat exchanger, a compressor that compresses the refrigerant subjected to the heat exchange with the cooling water in this evaporator into a high-temperature high-pressure refrigerant gas, a condenser that condenses the refrigerant gas from this compressor into a high-pressure liquid refrigerant, and an expansion valve that lowers a temperature of the liquid refrigerant from this condenser by reducing a pressure thereof; and the aforesaid expansion valve is an electronic expansion valve capable of controlling an opening degree by an electric signal from the aforesaid circuit means and serves as the aforesaid valve means for adjusting the flow rate of the refrigerant.

Furthermore, in the present invention, the aforesaid control section is preferably capable of changing the set temperature of the coolant.

DETAILED DESCRIPTION OF THE PREFERRED EMBODIMENTS

Figure 1:
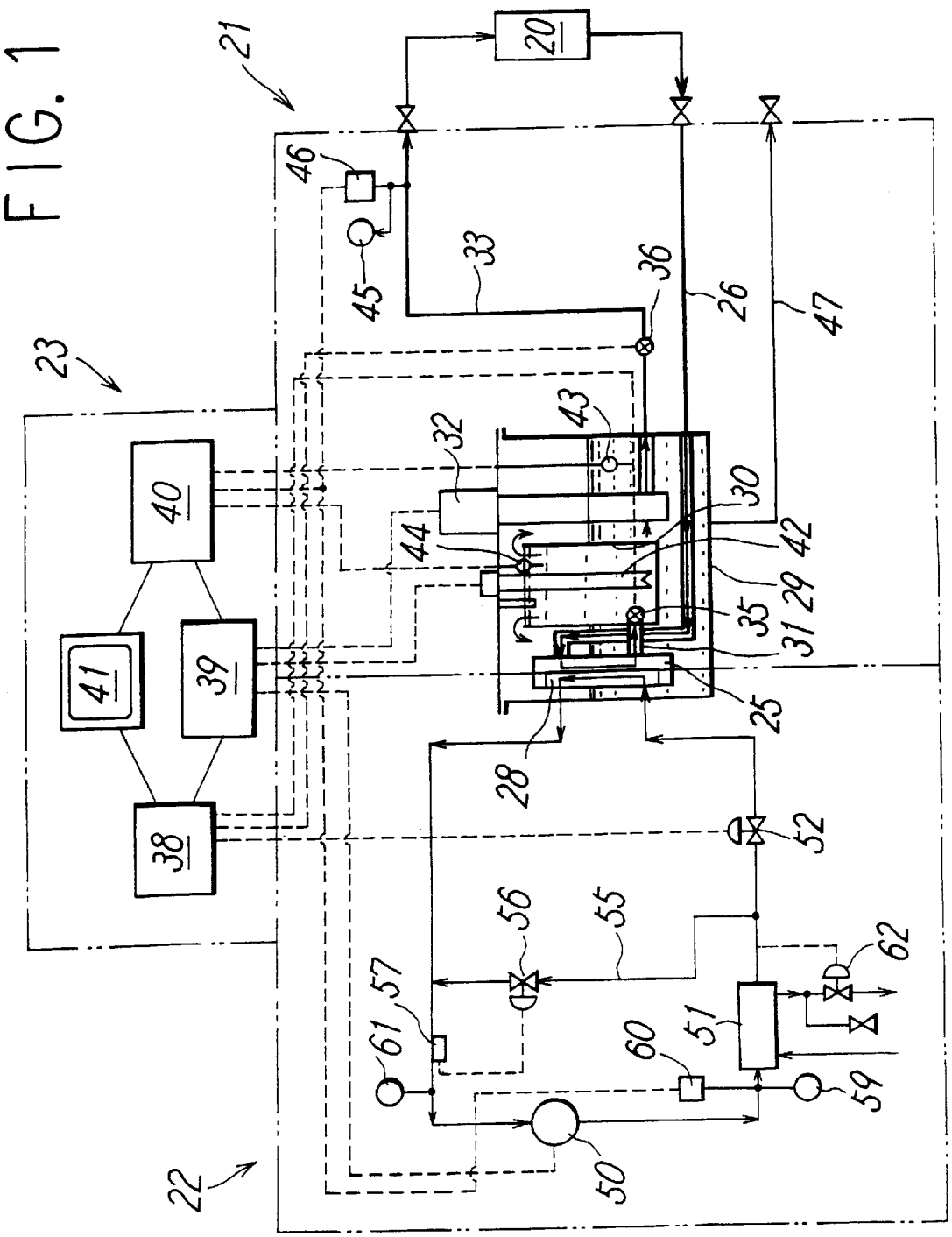
FIG. 1 is a construction view of a coolant circulating device according to the present invention.
Figure 2:
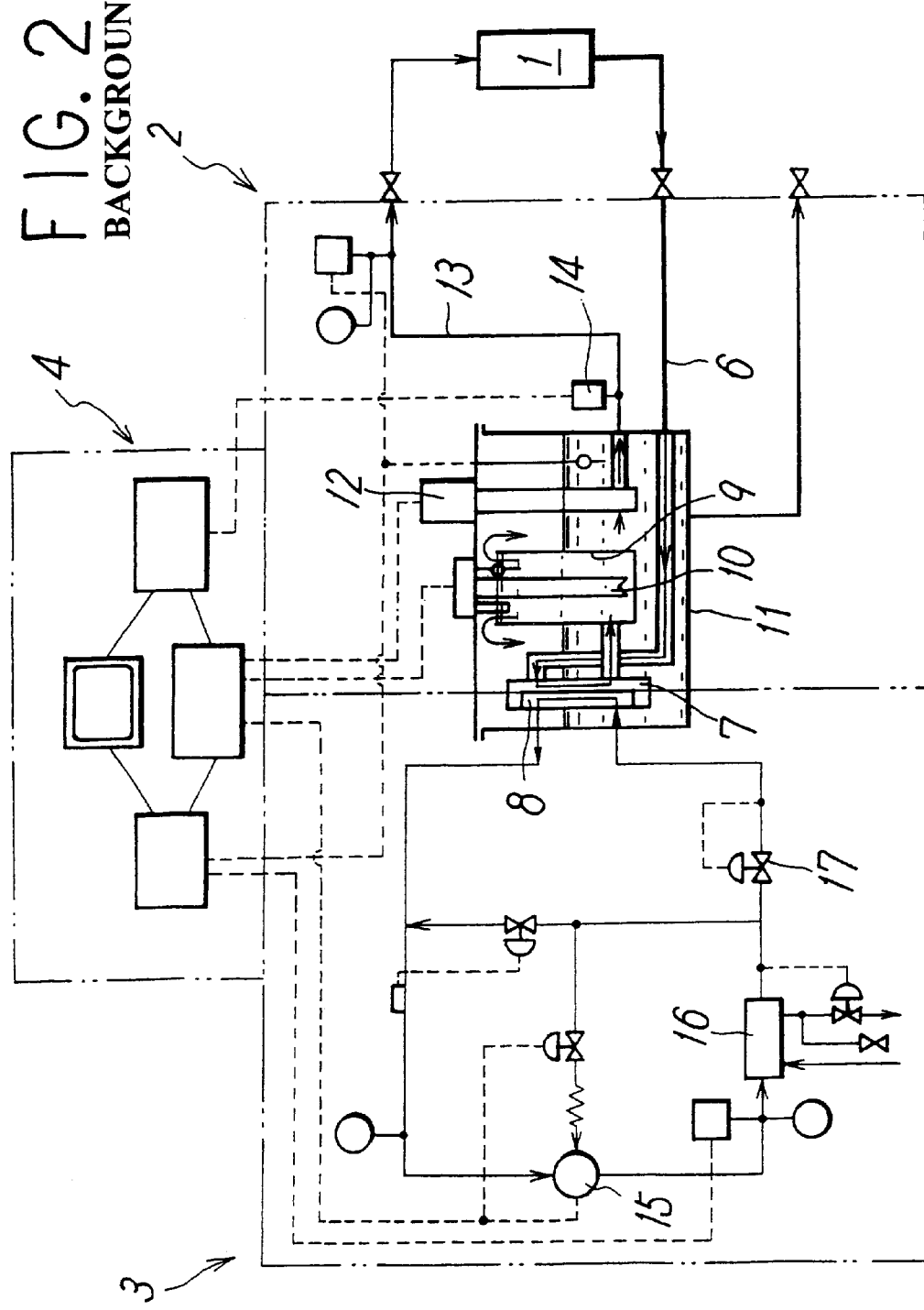
FIG. 2 is a construction view of a known coolant circulating device.

A coolant circulating device shown in FIG. 1 includes a coolant circuit 21 for circularly supplying a coolant to a load 20, a refrigerating circuit 22 in which the aforesaid coolant having a temperature raised by cooling the aforesaid load 20 is cooled in a heat exchanger 25 by allowing heat exchange with a refrigerant, and a control section 23 that controls these circuits 21, 22.

In the aforesaid coolant circuit 21, the coolant having its temperature raised by cooling the load 20 refluxes through a return pipe 26 into the heat exchanger 25. After the coolant is cooled in this heat exchanger 25 by heat exchange with a refrigerant flowing through an evaporator 28 of the aforesaid refrigerating circuit 22, the coolant flows through an outlet pipe 31 into an inside vessel 30 disposed in a tank 29 and having an open top, and then overflows this inside vessel 30 to flow into the tank 29. Then, the coolant in this tank 29 is circularly supplied through a supplying pipe 33 to the aforesaid load 20 by a pump 32.

In the inside of the aforesaid inside vessel 30, in the vicinity of an opening of the aforesaid outlet pipe 31 extending from the heat exchanger 25, there is disposed a first temperature sensor 35 for measuring the temperature of the coolant immediately after being cooled by the aforesaid heat exchanger 25 and, in the vicinity of an outlet of the tank 29, there is disposed a second temperature sensor 36 for measuring the temperature of the coolant supplied from the aforesaid tank 29 to the load 20. These temperature sensors 35, 36 are each connected to a first control circuit 38 in the aforesaid control section 23. Further, in the inside of the aforesaid inside vessel 30, there is disposed a heater 42 for heating the coolant, and this heater 42 is connected to a second control circuit 39 of the control section 23.

The Figure shows a level switch 43 that senses the liquid level of the coolant in the tank 29 to output a sensing signal to a third control circuit 40 of the control section 23, a level switch 44 that senses the liquid level of the coolant in the inside vessel 30 to likewise output a sensing signal to the third control circuit 40, a pressure gauge 45 that senses the pressure of the coolant sent to the load 20, a low pressure cutting switch 46 that outputs a signal of cutting the coolant to the aforesaid third control circuit 40 when the pressure sensed by this pressure gauge 45 falls below a predetermined value, and a drain pipe 47 for discharging the coolant in the aforesaid tank 29.

On the other hand, the aforesaid refrigerating circuit 22 is constructed in such a manner that the refrigerant evaporated by heat exchange with the coolant in the aforesaid evaporator 28 is compressed by a compressor 50 into a high-temperature high-pressure refrigerant gas; this refrigerant gas is cooled and condensed by a condenser 51 into a high-pressure liquid refrigerant; and then the temperature of this liquid refrigerant is lowered by reducing the pressure thereof by means of an electronic expansion valve 52 for supplying it to the aforesaid evaporator 28.

The aforesaid electronic expansion valve 52 has a function of adjusting the flow rate of the aforesaid refrigerant in addition to the function of reducing the pressure of the refrigerant as described above, and is connected to the first control circuit 38 of the aforesaid control section 23. Its opening degree is controlled by an electric signal from this first control circuit 38 in accordance with the temperature of the coolant measured by the aforesaid first temperature sensor 35. The flow rate of the refrigerant flowing into the evaporator 28 is adjusted by the control of the opening degree to increase or decrease the cooling capability of the heat exchanger 25. Specifically, in the case where the temperature of the coolant measured by the aforesaid first temperature sensor 35 is higher than the set temperature set in the control section 23, the opening degree of the aforesaid electronic expansion valve 52 increases to increase the flow rate of the refrigerant flowing into the heat exchanger 25, whereby the cooling capability increases to lower the temperature of the coolant. On the other hand, if the measured temperature of the coolant is lower than the set temperature, the opening degree of the aforesaid electronic expansion valve 52 decreases to decrease the flow rate of the aforesaid refrigerant, whereby the cooling capability decreases to dissolve excessive cooling of the coolant and the temperature thereof is, maintained at the set temperature. As a result of this, even if the temperature rise of the coolant varies in accordance with the heat quantity of the load 20, the cooling capability of the refrigerating circuit 22 is automatically adjusted in accordance with the temperature, whereby the aforesaid coolant is cooled to maintain the set temperature with certainty.

Further, the aforesaid refrigerating circuit 22 includes a refluxing circuit 55 that refluxes a part of the refrigerant condensed by the condenser 51 directly to the inlet side of the compressor 50 without allowing it to flow into the aforesaid electronic expansion valve 52 when the outlet temperature of the evaporator 28 is higher than usual, and a temperature-actuated expansion valve 56 capable of adjusting the amount of refrigerant circulation in the aforesaid refluxing circuit 55. This temperature-actuated expansion valve 56 is controlled by a temperature sensor 57 that senses the temperature of the refrigerant refluxed to the compressor 50, and lowers the refrigerant temperature by increasing an opening degree of the aforesaid expansion valve 56 to allow the refrigerant from the condenser 51 to flow through the aforesaid refluxing circuit 55 when the temperature of the aforesaid refrigerant sucked into the compressor 50 becomes high.

In a flow path between the compressor 50 and the condenser 51 in the aforesaid refrigerating circuit 22, there are disposed a high-pressure refrigerant pressure gauge 59 that senses the pressure of the high-temperature high-pressure refrigerant gas, and a high-pressure refrigerant cutting switch 60 that outputs a cutting signal to the third control circuit 40 when the pressure of the refrigerant gas rises above a predetermined pressure. A low-pressure refrigerant pressure gauge 61 that senses the pressure of the low-pressure refrigerant gas is disposed on the refrigerant gas inlet (refluxing) side of the compressor 50. Further, in the aforesaid condenser 51, there is disposed a pressure water-controlling valve 62 that regulates the flow rate of cooling water supplied thereto.

The aforesaid control section 23 includes the first to third control circuits 38 to 40 described above and an operation display section 41. Among these, the first control circuit 38 has a function of controlling an opening degree of the electronic expansion valve 52 on the basis of the measured temperature signal from the first temperature sensor 35 as described above but, in addition thereto, this first control circuit 38 has a function of controlling energization of the heater 42 in accordance with the difference between the temperature measured by the aforesaid first temperature sensor-35 and the set temperature. In other words, if the heat quantity of the aforesaid load 20 is small or zero, the temperature of the coolant rises only a little or, if the temperature is higher than an external atmospheric temperature, the temperature of the coolant may fall below the set temperature by heat dissipation to the external atmosphere in some cases. In such a case, even if the cooling capability of the aforesaid refrigerating circuit 22 is restricted to the minimum, the coolant is further cooled by the heat exchanger 25. Therefore, the aforesaid first control circuit 38 operates to send a signal to the second control circuit 39 when the temperature measured by the first temperature sensor 35 falls below the set temperature by more than a predetermined value, and to energize the heater 42 to compensate for the aforesaid temperature decrease by this heater 42, thereby to raise the temperature of the coolant up to the set temperature.

Further, the aforesaid second control circuit 39 is constructed with a device such as an electromagnetic contactor, an electromagnetic switch, or a solid state relay, and operates on receiving a signal from the aforesaid first control circuit 38 and the third control circuit 40 to control the aforesaid compressor 50, the pump 32, and the heater 42 by the aforesaid device.

Further, the aforesaid third control circuit 40 is constructed as a programmable logic controller (PLC) and outputs a signal to the aforesaid second control circuit 39 and the operation display section 41 by the signals from the level switch 43 in the tank 29, the level switch 44 in the inside vessel 30, the low-pressure cutting switch 46, the high-pressure refrigerant cutting switch 60, and others.

Further, the aforesaid operation display section 41 is adapted to be capable of setting the temperature of the coolant to be supplied to the load 20, and the set temperature and the measured temperature measured by the second temperature sensor 36 are displayed by an appropriate method and also output to the first control circuit 38 and the third control circuit 40. Further, the aforesaid set temperature can be changed by touching a panel.

In the coolant circulating device of the present invention having the aforesaid construction, the temperature of the coolant rises in the case of cooling the load 20 having a large heat quantity. The coolant having a raised temperature is cooled to the set temperature by heat exchange with the refrigerant in the refrigerating circuit 22 in the heat exchanger 25, and is supplied to the load 20 again by the pump 32 after being housed in the tank 29.

The temperature of the aforesaid coolant is measured by the first temperature sensor 35 on the inlet side of the tank 29 and, by controlling the opening degree of the aforesaid electronic expansion valve 52 in accordance with the temperature to adjust the cooling capability of the refrigerating circuit, the coolant is maintained at the set temperature. In other words, if the temperature of the coolant measured by the aforesaid first temperature sensor 35 is higher than the set temperature, the opening degree of the aforesaid electronic expansion valve 52 is allowed to increase by the first control circuit 38 to increase the flow rate of the refrigerant flowing into the evaporator 28, whereby the cooling capability increases to lower the temperature of the coolant to the set temperature. On the other hand, if the measured temperature of the coolant is lower than the set temperature, the opening degree of the aforesaid electronic expansion valve 52 decreases to decrease the flow rate of the aforesaid refrigerant, whereby the cooling capability decreases to dissolve excessive cooling of the coolant and the temperature thereof is maintained at the set temperature. Thus, the aforesaid coolant is maintained at the set temperature by adjusting the cooling capability of the refrigerating circuit 22 in accordance with the temperature of the coolant.

Furthermore, if the heat quantity of the load is small or zero, the temperature of the aforesaid coolant does not rise and, if the liquid temperature is higher than an external atmospheric temperature, the temperature of the coolant may fall below the set temperature by heat dissipation to the outside in some cases. In such a case, even if the cooling capability of the aforesaid refrigerating circuit 22 is restricted to the minimum, the coolant is cooled by the heat exchanger 25, thereby to let the temperature fall below the set temperature, so that it is not possible to maintain the coolant at the set temperature by mere adjustment of the cooling capability of the refrigerating circuit 22. Therefore, when the temperature measured by the aforesaid first temperature sensor 35 falls below the set temperature by more than a predetermined value, the first control circuit 38 sends a signal to the second control circuit 39 to turn the heater 42 on, and compensates for the aforesaid temperature decrease by this heater 42 to raise the temperature of the coolant up to the set temperature. The aforesaid heater 42 is used auxiliarily for the purpose of compensating for the aforesaid temperature decrease in such a case alone, so that a small one having small electric power consumption can be used.

What is claimed is:

1. A thermostatic coolant circulating device comprising:

a refrigerating circuit including a heat exchanger configured to exchange heat between a coolant and a refrigerant to cool the coolant heated by a load, said refrigerating circuit including a valve positioned to adjust a flow rate of the refrigerant supplied to said heat exchanger;

a coolant circuit for circulating the coolant to the load, said coolant circuit including a temperature sensor configured to measure a temperature of the coolant cooled in said heat exchanger, a tank for housing the coolant sent out from said heat exchanger, a heater configured to raise the temperature of said coolant, and a pump positioned to supply the coolant in said tank to the load, said temperature sensor being disposed at an outlet of said heat exchanger to measure the temperature of the coolant before being heated by the heater; and a control section configured to energize said heater when the temperature of the coolant measured by said temperature sensor falls below a set temperature by more than a predetermined value and control the coolant circuit and refrigerating circuit, said control section including a circuit section configured to adjust opening of said valve such that the temperature of the coolant measured by said temperature sensor becomes the set temperature.

2. A thermostatic coolant circulating device as set forth in claim 1, wherein:

said refrigerating circuit has an evaporator disposed in said heat exchanger, a compressor configured to compress the refrigerant subjected to the heat exchange with the cooling water in said evaporator into a high-temperature high-pressure refrigerant gas, a condenser configured to condense the refrigerant gas from said compressor into a high-pressure liquid refrigerant, and an expansion valve positioned to reduce a pressure thereof to lower a temperature of the liquid refrigerant from said condenser; and said expansion valve is an electronic expansion valve positioned to control opening by an electric signal from said circuit section and serves as said valve positioned to adjust the flow rate of the refrigerant.

3. A thermostatic coolant circulating device as set forth in claim 1, wherein said control section is configured to change the set temperature of the coolant.

4. A thermostatic coolant circulating device comprising:

cooling means for cooling a coolant when a temperature of said coolant is raised after cooling a load, said cooling means including a heat exchanger configured to exchange heat between a refrigerant and said coolant, and adjusting means for adjusting a flow rate of the refrigerant supplied to said heat exchanger;

coolant circulating means for circulating said coolant to the load, said coolant circulating means including temperature measuring means for measuring a temperature of the coolant cooled in said heat exchanger, a tank for housing the coolant sent out from said heat exchanger, heating means for heating said coolant, and pumping means for pumping the coolant in said tank to the load, said temperature measuring means being disposed at an outlet of said heat exchanger to measure the temperature of the coolant before being heated by the heating means; and controlling means for controlling said heating means according to the temperature of the coolant measured by said temperature measuring means, a set temperature and a predetermined temperature deviation, and said adjusting means such that the temperature of the coolant measured by said temperature measuring means becomes the set temperature.

\* \* \* \* \*